(12) United States Patent
Yuen et al.

(10) Patent No.: US 7,542,657 B2
(45) Date of Patent: *Jun. 2, 2009

(54) VIDEO TAPE INDEXING SYSTEM AND METHOD

(75) Inventors: Henry C. Yuen, Pasadena, CA (US); Wing P. Leung, Arcadia, CA (US)

(73) Assignee: Index Systems, Inc., Los Angeles, CA (US)

(*) Notice: Subject to any disclaimer, the term of this patent is extended or adjusted under 35 U.S.C. 154(b) by 988 days.

This patent is subject to a terminal disclaimer.

(21) Appl. No.: 10/601,224

(22) Filed: Jun. 20, 2003

(65) Prior Publication Data

US 2004/0086266 A1 May 6, 2004

Related U.S. Application Data

(63) Continuation of application No. 09/467,538, filed on Dec. 18, 1999, now Pat. No. 6,608,963.

(60) Provisional application No. 60/112,945, filed on Dec. 18, 1998.

(51) Int. Cl.
*H04N 5/91* (2006.01)

(52) U.S. Cl. .......................................... 386/83; 386/95

(58) Field of Classification Search ................... 386/83, 386/95; 725/39, 58
See application file for complete search history.

(56) References Cited

U.S. PATENT DOCUMENTS

| | | | |
|---|---|---|---|
| 5,253,066 A | 10/1993 | Vogel et al. | |
| 5,260,788 A | 11/1993 | Takano et al. | |
| 5,353,121 A | 10/1994 | Young et al. | |
| 5,361,173 A | 11/1994 | Ishii et al. | |
| 5,390,027 A | 2/1995 | Henmi et al. | |
| 5,541,738 A | 7/1996 | Mankovitz | |
| 5,761,371 A | 6/1998 | Ohno et al. | |
| 5,867,226 A | 2/1999 | Wehmeyer et al. | |
| 5,930,449 A | 7/1999 | Hwang | |
| 6,177,931 B1 * | 1/2001 | Alexander et al. | 725/39 |
| 6,608,963 B1 * | 8/2003 | Yuen et al. | 386/83 |

FOREIGN PATENT DOCUMENTS

| | | |
|---|---|---|
| JP | 06-103641 | 4/1994 |
| JP | 07-021748 | 1/1995 |
| WO | WO 92/22983 | 12/1992 |

\* cited by examiner

*Primary Examiner*—Vincent F Boccio
(74) *Attorney, Agent, or Firm*—Ropes & Gray LLP

(57) ABSTRACT

A video tape indexing system in which program broadcast identification information is entered into the system for use in recording the program. When the program is recorded, the system stores indexing information in an index memory. The system monitors a broadcast channel for electronic program guide information that includes titles and usually channel, date, time and length for the titles. The system matches the channel, date, time and length information from the broadcast channel with the identification information entered for the program to be recorded. The title in the broadcast channel associated with the channel, date, time and length information is then associated with the indexing information for the program.

21 Claims, 2 Drawing Sheets

VIDEO TAPE INDEXING SYSTEM AND METHOD

RELATED APPLICATION

This application is a continuation of U.S. patent application Ser. No. 09/467,538, filed on Dec. 18, 1999 now U.S. Pat. No. 6,608,963 which claims priority of U.S. provisional Application No. 60/112,945 filed Dec. 18, 1998, the disclosure of which is incorporated fully herein. This application is also related to application Ser. No. 08/777,799, filed on Dec. 31, 1996, the disclosure of which is incorporated fully herein by reference.

BACKGROUND OF THE INVENTION

One of the major cost items in the Index Plus+ system is the memory needed to store the information of the shows, which includes channel, date, time, length and title of a show. This practically requires as much memory as is needed for implementation of an electronic program guide (EPG). Also, the number of days in advance of the program telecast that recordings can be scheduled is limited by memory and data bandwidth.

The invention greatly reduces the memory requirement and hence the cost of implementation. It is primarily intended to be implemented without a locally stored EPG data base.

SUMMARY OF THE INVENTION

The system includes an input that receives indications identifying a television program broadcast, including one or more of channel, start time, end time, date, day of the week and length. It also includes a video system recorder controller that provides commands to one or more of a video recorder and a tuner to record a television program according to one of the input indications, an index memory that stores video tape identification and video tape index information and the identification indication for television programs recorded under control of the video system recorder controller and a data receiver that receives data comprising titles, sets of television broadcast identifiers, each such set including one or more of channel, start time, end time, date, day of the week and length, and associations between a plurality of the titles and a plurality of the sets of television broadcast identifiers. The title from the data receiver is stored in the index memory and associated with the video tape identification and video tape index information and the identification indication associated with the title.

DETAILED DESCRIPTION

Figure 1:
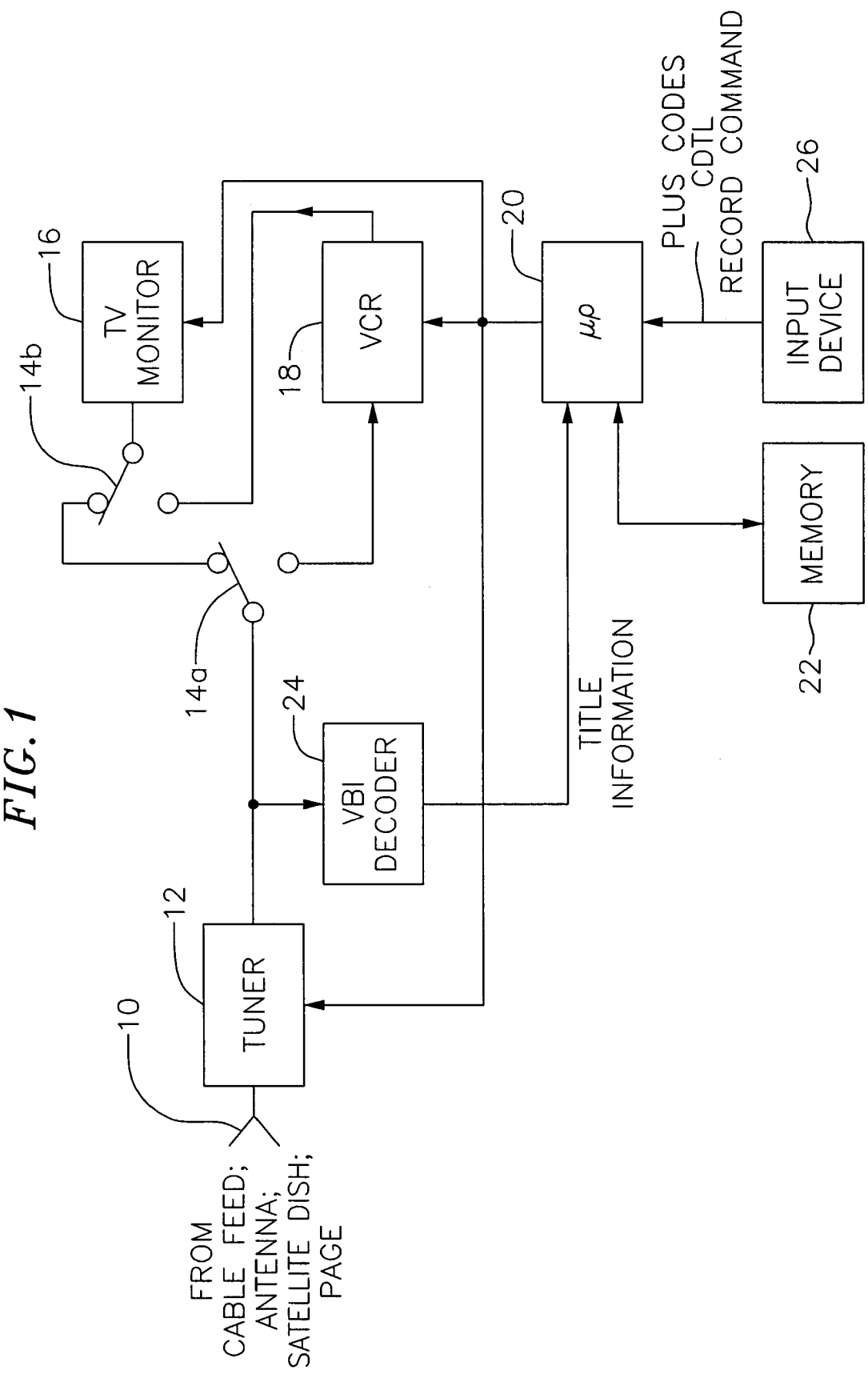
FIG. 1 is a block diagram of a system according to a preferred embodiment of the invention.

The concept is first to accept as an input at a user terminal either through (a) VCR Plus+, (b) direct channel/date/time/length (CDTL) input, or (c) instant, i.e., real time, recording, the CDTL information of the show(s) the user wishes to record. In case (a), the Plus Codes are decoded to produce CDTL information. In case (c), the time that the record command is given is read from a real time clock and the channel to which the tuner is set is read at the time of the record command. (There is usually no length information in this case.) In cases (a) and (b), the CDTL information, is stored in an appropriate memory (either in a RAM in the VCR, on the tape, or on a chip attached to the tape cassette, etc.). In case (c), the channel and time of the record command are stored in the memory. In cases (a) and (b), the time component of the CDTL information is compared with the output of a real time clock; when a match occurs, the tuner is set to the channel represented by the CDTL information and the VCR is turned on to record the show the user has selected. In all cases, the location of the program being recorded on the tape is also stored in the memory with the channel and time information. In all cases, date may be replaced with day of the week and length may be replaced with end time or start time and length can be replaced with end time and length. If the recording is performed on the same day as it is programmed to be recorded even the date or day of the week can be omitted. Also, because recording automatically stops at the end of the tape, the length or end time is not critical to the system's operation either.

On a regular basis, e.g., once a day or every other day, all the program titles (and related data) for a specified time period are transmitted with the television signal, e.g., in the VBI. Alternatively, the data may be sent in a distributed way over a long period of time, e.g., 24 hours. In the latter case, the receiving equipment has to monitor the VBI data over the time of data broadcast (e.g., 24 hours). The channel and time of telecast of each program are included with the program title. The title of a program, and other related information such as the theme of the program, if desired, is selectively grabbed only at the users terminals that have already recorded or are scheduled to record that program. Specifically, the channels and times stored in memory at the user terminal are compared with the time and channel transmitted with each title. When a match occurs, the transmitted title is stored in memory. It may be used at the user terminal either together with the CDTL information or as a replacement for the channel and time stored therein. As a result, ultimately the title is stored with the location of each recorded program and other grabbed information in a tape directory in memory at the user terminals. When the user wishes to play a recorded program, the directory is displayed on the screen of a television monitor and the user marks the desired program with an on screen cursor. The VCR then transports the tape to the beginning of the desired program and the desired program is played.

For Example:

At time T1, the user inputs a PlusCode (or other form of CDTL information) indicating which program to record; the equipment generates and stores the CDTL information.

At time T2, either before or after the recording of the desired program, a download session occurs in which all the program titles, channels, and times for a given time period are transmitted with the television signal to the users; the VCR of each user flags down only the titles (including other information such as theme related to the program) corresponding to the CDTL information stored at that user terminal, stores these titles in memory or replaces the corresponding CDTL information in the memory with the titles.

After T2, the titles will be utilized by the user for display of directories and selection of recorded programs at that user terminal.

FIG. 1 illustrates a user terminal. A cable feed 10 or other television signal source such as an antenna or satellite dish is connected to a tuner 12, which is part of a cable box, television receiver, or satellite receiver. A switch 14a alternatively connects tuner 12 to a television monitor 16 for program viewing or to a VCR 18 for program recording. A switch 14b alternatively connects tuner 12 for viewing or VCR 18 for playback to monitor 16. Tuner 12, switch 14a, switch 14b, monitor 16, and VCR 18 are controlled by a microprocessor 20 having a memory 22 such as a RAM. Assuming analog transmission of the television signal, a VBI decoder 24 is connected between tuner 12 and switch 14a to extract program title information from the VBI of the television signal. (If the television signal is transmitted in digital form, no VBI decoder is needed.) This title information is coupled to microprocessor 20 for storage in memory 22. An input device 26 such as a remote controller is coupled to microprocessor 20 to enter user commands. As is well known, another tuner and appropriate switching could be provided to permit simultaneous television viewing and VCR recording. The Plus Codes, CDTL information, or instant recording command is entered into microprocessor 20 by input device 26. Microprocessor 20 stores the CDTL information, or channel and time, as the case may be, in memory 22 and, in cases (a) and (b), compares the time component with the output of the real time clock, which is internal to microprocessor 20. At the time of the program to be recorded, microprocessor 20 connects tuner 12 to VCR 18 through switch 14a, sets tuner 12 to the channel represented by the CDTL information in cases (a) and (b) or the selected channel in case (c), turns on VCR 18 for the duration of the program, and stores the tape location in memory 22 with the title or CDTL information, depending upon whether the title is grabbed before or after the recording. The title, channel, and time information for each time period, e.g., a 24-hour day, may be transmitted several times during the time period, and thus may arrive before or after the CDTL information or the instant record command is entered through input device 26. (In an alternative embodiment, the title, channel, and time information may be transmitted after the time period in which the programs are transmitted, and thus would always arrive after the CDTL information or the instant record command is entered through input device 26.) As the title, channel, and time information, for each program is being transmitted in the television signal, it is extracted by VBI decoder 24. Microprocessor 20 compares the channel and time with the channel and time of the CDTL information stored in memory 22. If a match occurs, the title is grabbed and stored. The title is substituted for the CDTL information if the title is grabbed after recording. The title is stored in addition to the CDTL information if the title is grabbed before recording and then the CDTL information is discarded after recording. Otherwise the transmitted title, channel, and time information is discarded. Alternatively, the CDTL information could be stored for later use and display in either case.

Figure 2:
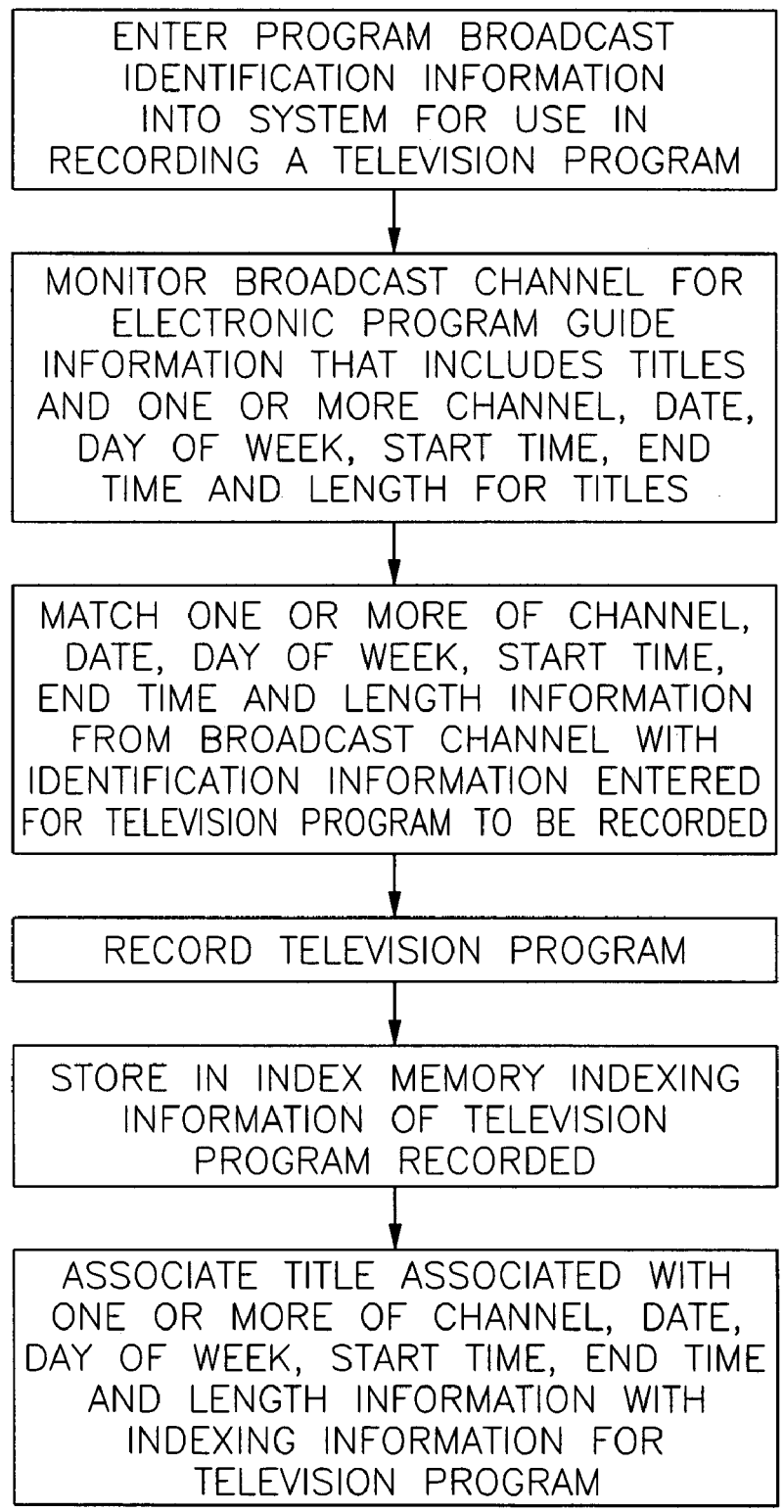
FIG 2. illustrates in flow diagram form an example of the process in accordance with an embodiment of the present invention.

FIG 2. illustrates in flow diagram form an example of the process in accordance with an embodiment of the present invention.

In summary, only the titles of the recorded programs or the programs to be recorded are selectively grabbed and stored, rather than all the programs telecast during a specified time period. In addition, only the CDTL information of the programs to be recorded is also stored. The result is a versatile tape management capability with a small storage requirement.

When the user wishes to play back a recorded program, VCR 18 is connected to monitor 16 through switch 14b. The user loads the corresponding tape cassette into VCR 18. Microprocessor 20 retrieves the program titles on the tape from memory 22 and feeds this information through VCR 18 to monitor 16 for display as a directory of the tape. When the user selects one of the titles from the on-screen directory, microprocessor 20 transports VCR 18 to the start of the selected program on the tape.

If the CDTL information is stored early enough, the transmitted program titles could be included in a conventional EPG data stream transmitted before the program is recorded and extracted therefrom for the described purpose. (application Ser. No. 08/728,614, filed on Oct. 10, 1996 is incorporated by reference as if set forth in full herein for a description of how such a data stream is transmitted.) Otherwise, the titles are selectively grabbed from a customized data stream transmitted before and/or after the program is recorded.

In an alternative embodiment, the title information is received using a wireless receiver (not shown) such as a pager receiver.

The invention claimed is:

1. A video system recorder controller for indexing programs recorded by a video recorder comprising:
    a microprocessor, the microprocessor having;
        a scheduling input port responsive to an input of one or more sets of broadcast scheduling information, including one or more of channel, start time, end time, date, day of the week and length;
        an identification input port responsive to data from a television broadcast including:
        one or more titles:
        one or more sets of broadcast identification information, each set including one or more of channel, start time, end time, date, day of the week and length; and
        associations between a plurality of the titles and a plurality of the sets of broadcast identification information;
    a bidirectional memory port for sending data to an index memory and retrieving it from the index memory; and
    wherein after one or more sets of broadcast scheduling information have been received by the scheduling input port and stored in the index memory by the microprocessor, and after one or more sets of broadcast identification information, titles and associations have been received by the identification input port, a title is selected by the microprocessor, stored in the index memory and associated with the set of stored broadcast scheduling information if the set of broadcast identification information having an association with the title matches the set of stored broadcast scheduling information.

2. The video system recorder controller of claim 1, further comprising a microprocessor having an output port that provides commands to one or more of a video recorder and a tuner to record a television program according to one of the sets of broadcast scheduling information.

3. The video system recorder controller of claim 2, wherein after a program associated with the set of broadcast scheduling information has been recorded the microprocessor discards the one or more of channel, start time, end time, date, day of the week and length indicators from a set of broadcast scheduling information stored in the index memory.

4. The video system recorder controller of claim 2, wherein the microprocessor compares a time component of the one or more sets of broadcast identification information with an output of a real time clock integral to the microprocessor to determine when to provide a command through the output port to record a television program.

5. The video system recorder controller of claim 2, wherein the microprocessor stores one or more tape locations in the index memory to mark a beginning and an end of a recording session.

6. The video system recorder controller of claim 1, wherein the identification input port responsive to data from a television broadcast is connected to a VBI decoder.

7. The video system recorder controller of claim 1, wherein the identification input port responsive to data from a television broadcast is connected to a wireless receiver.

8. A method for indexing programs recording by a video recorder comprising:
receiving an input of one or more sets of broadcast scheduling information, including one or more of channel, start time, end time, date, day of the week and length;
storing the one or more sets of broadcast scheduling information in an index memory;
receiving data from a television broadcast including:
one or more titles,
one or more sets of broadcast identification information, each set including one or more of channel, start time, end time, date, day of the week and length; and
associations between a plurality of the titles and a plurality of the sets of broadcast identification information; matching the one or more sets of broadcast identification information with the one or more sets of stored broadcast scheduling information;
storing a title having an association with the one or more sets of broadcast identification information in the index memory if the one or more sets of broadcast identification information is matched to one or more sets of stored broadcast scheduling information to provide a stored title; and
associating the stared title in the index memory with the one or more sets of stored broadcast scheduling information matched to the one or more sets of broadcast identification information having an association with the title.

9. The method of claim 8, further comprising:
providing commands through an output port to one or more of a video recorder and a tuner to record a television program according to one of the sets of broadcast scheduling information.

10. The method of claim 9, further comprising:
discarding the one or more of channel, start time, end time, date, day of the week and length indicators from a set of broadcast scheduling information stored in the index memory after a program associated with the set of broadcast scheduling information has been recorded.

11. The method of claim 8, wherein data is received from a television broadcast using a VBI decoder.

12. The method of claim 8, wherein data is received from a television broadcast using a wireless receiver.

13. A video system recorder controller for indexing programs recorded by a video recorder comprising:
a processing means for coordinating and processing video system recorder controller input and output;
a scheduling input means coupled to the processing means responsive to an input of one or more sets of broadcast scheduling information, including one or more of channel, start time, end time, date, day of the week and length;
on identification input means coupled to the processing means responsive to data from a television broadcast including:
one or more titles;
one or more sets of broadcast identification information, each set including one or more of channel, start time, end time, date, day of the week and length; and
associations between a plurality of the titles and a plurality of the sets of broadcast identification information;
a memory input-output means coupled to the processing means for sending data to an index memory and retrieving it from the index memory; and
wherein after one or more sets of broadcast scheduling information have been received by the scheduling input means and stored in the index memory by the processing means, and after one or more sets of broadcast identification information, titles and associations have been received by the identification input means, a title is selected by the processing means, stored in the index memory and associated with the set of stored broadcast scheduling information if the set of broadcast identification information having an association with the title matches the set of stored broadcast scheduling information.

14. The video system recorder controller of claim 13 wherein the processing means provides commands to one or more of a video recorder and a tuner to record a television program according to a set of broadcast scheduling information.

15. The video system recorder controller of claim 13 wherein the processing means discards site one or more of channel, start time, end time, date, day of the week and length indicators from a set of broadcast, scheduling information stored in the index memory after a program associated with the set of broadcast scheduling information has been recorded.

16. The video system recorder controller of claim 13 wherein the identification input means responsive to the data from a television broadcast is connected to a VBI decoder.

17. The video system recorder controller of claim 13 wherein the identification input means responsive to the data from a television broadcast is connected to a wireless receiver through a VBI decoder.

18. A video system recorder controller for indexing programs recorded by a video recorder comprising:
an input means for receiving one or more sets of television program broadcast scheduling information, including one or more of channel, start time, end time, date, day of the week and length;
a controller means, coupled to the input means, for providing commands to one or more of a video recorder and a tuner to record a television program according to one of the sets of broadcast scheduling information;
an index memory means, coupled to the controller means, for storing video medium identification, video medium index information and the broadcast scheduling information for television programs recorded under control of the controller means;
a data receiver means, coupled to the controller means, for receiving data from a television broadcast, including titles, sets of television program broadcast identification information, each such set including one or more of channel, start time, end time, date, day of the week and length, and associations between a plurality of the titles and a plurality of the sets of television program broadcast identification information; and
wherein after one or more sets of television program broadcast scheduling information have been received by the input, the title of a television program scheduled to be recorded or having already been recorded is selected from a television broadcast being monitored by the data receiver, stored in the index memory, and associated with the previously stored broadcast scheduling information if the broadcast identification information associated with the title matches the broadcast scheduling information used to identify the program for recording.

19. The video system recorder controller of claim 18 wherein the controller means discards the one or more of channel, start time, end time, date, day of the week and length indicators from a set of broadcast scheduling information stored in the index memory after a program associated with the set of broadcast scheduling information has been recorded.

20. The video system recorder controller of claim 18 wherein the data receiver means for receiving data from a television broadcast is connected to a VBI decoder.

21. The video system recorder controller of claim 18 wherein the data receiver means for receiving data from a television broadcast is connected to a wireless receiver through a VBI decoder.

* * * * *

UNITED STATES PATENT AND TRADEMARK OFFICE
CERTIFICATE OF CORRECTION

PATENT NO. : 7,542,657 B2
APPLICATION NO. : 10/601224
DATED : June 2, 2009
INVENTOR(S) : Yuen et al.

It is certified that error appears in the above-identified patent and that said Letters Patent is hereby corrected as shown below:

In column 1, line 55, please replace "FIG 2." with --FIG. 2--;

In column 2, line 3, please delete "," after "information"; and

In column 3, line 52, please replace "FIG 2." with --FIG. 2--.

In claim 8, column 5, line 11, please replace "recording" with --recorded--;

In claim 8, column 5, line 34, please replace "stared" with --stored--;

In claim 13, column 5, line 64, please replace "on" with --an--; and

In claim 15, column 6, line 31, please delete "," after "broadcast".

Signed and Sealed this

Twenty-fifth Day of August, 2009

David J. Kappos
*Director of the United States Patent and Trademark Office*